US011856991B2

(12) United States Patent
Bernhard et al.

(10) Patent No.: US 11,856,991 B2
(45) Date of Patent: Jan. 2, 2024

(54) ACTIVATABLE AND RECLOSABLE CARTRIDGE ASSEMBLY FOR AN AEROSOL-GENERATING SYSTEM

(71) Applicant: PHILIP MORRIS PRODUCTS S.A., Neuchatel (CH)

(72) Inventors: Philipp Bernhard, Thun (CH); Antonino Lanci, Bern (CH); Hannes Merz, Olten (CH); Patrick Charles Silvestrini, Neuchatel (CH); Irene Taurino, Lausanne (CH); Ihar Nikolaevich Zinovik, Peseux (CH)

(73) Assignee: Philip Morris Products S.A., Neuchatel (CH)

( * ) Notice: Subject to any disclaimer, the term of this patent is extended or adjusted under 35 U.S.C. 154(b) by 568 days.

(21) Appl. No.: 16/972,054

(22) PCT Filed: Jun. 20, 2019

(86) PCT No.: PCT/EP2019/066407

§ 371 (c)(1),
(2) Date: Dec. 4, 2020

(87) PCT Pub. No.: WO2019/243545

PCT Pub. Date: Dec. 26, 2019

(65) Prior Publication Data

US 2021/0212367 A1 Jul. 15, 2021

(30) Foreign Application Priority Data

Jun. 21, 2018 (EP) .................................... 18179114

(51) Int. Cl.
*A24F 40/465* (2020.01)
*A24F 40/30* (2020.01)
(Continued)

(52) U.S. Cl.
CPC .............. *A24F 40/465* (2020.01); *A24F 7/00* (2013.01); *A24F 40/30* (2020.01); *A24F 40/42* (2020.01);
(Continued)

(58) Field of Classification Search
CPC ...... A24F 40/465; A24F 40/485; A24F 40/30; A24F 40/42; A24F 40/10; A24F 7/00; A24F 7/02; H05B 6/105
(Continued)

(56) References Cited

U.S. PATENT DOCUMENTS

2015/0342257 A1 12/2015 Chen
2023/0180819 A1 * 6/2023 Courbat ............... A24B 15/167 219/628

(Continued)

FOREIGN PATENT DOCUMENTS

EP 2976954 1/2016
EP 3047743 7/2016

(Continued)

OTHER PUBLICATIONS

Search Report and Written Opinion for PCT/EP2019/066407 dated Sep. 11, 2019 (9 pages).

(Continued)

*Primary Examiner* — Khiem M Nguyen
(74) *Attorney, Agent, or Firm* — Mueting Raasch Group

(57) ABSTRACT

A reclosable cartridge assembly (10) for use in an aerosol-generating system comprises: a cartridge (12) extending longitudinally between end walls (22, 26); a housing (30, 32) enclosing the cartridge (12) and comprising: an upstream portion with an end wall (22) comprising an opening (42); and a downstream housing portion (32) with an end wall comprising an opening (44). One of the housing portions (30, 32) is rotatably fitted onto the cartridge (12).
(Continued)

One of the cartridge end walls (22, 26) comprises a rupturable portion (38, 40) separable from the remainder of the end wall to expose an opening (42, 44) in the end wall. The rotatable housing portion (30, 32) is adapted to engage the rupturable portion (38, 40) such that, upon rotation from a storage position to a dispensing position, the housing portion (30, 32) breaks off the rupturable portion (38, 40) and exposes the opening (42, 44) in the end wall. When the housing portion (30, 32) is in the dispensing position, the opening (46, 48) in the housing portion (30, 32) is in fluid communication with the exposed opening (42, 44) in the cartridge (12). The housing portion (30, 32) is further reversibly rotatable between the dispensing position and a closed position. When in the closed position, the end wall of the housing portion (30, 32) obstructs the exposed opening (42, 44) in the cartridge.

18 Claims, 3 Drawing Sheets

(51) Int. Cl.

*A24F 40/42* (2020.01)
*A24F 40/485* (2020.01)
*A24F 7/00* (2006.01)
*H05B 6/10* (2006.01)
*A24F 40/10* (2020.01)

(52) U.S. Cl.

CPC .......... *A24F 40/485* (2020.01); *H05B 6/105* (2013.01); *A24F 40/10* (2020.01)

(58) Field of Classification Search

USPC .......................................................... 131/329
See application file for complete search history.

(56) References Cited

U.S. PATENT DOCUMENTS

| | | | | |
|---|---|---|---|---|
| 2023/0247725 A1* | 8/2023 | Silvestrini | ............ | A24F 40/485 131/329 |
| 2023/0255262 A1* | 8/2023 | Blattler | .................. | A24F 40/42 131/273 |

FOREIGN PATENT DOCUMENTS

| | | |
|---|---|---|
| EP | 3254572 | 12/2017 |
| WO | WO 2008/121610 | 10/2008 |
| WO | WO 2015/000974 | 1/2015 |
| WO | WO 2015/197627 | 6/2015 |
| WO | WO 2016/046362 | 9/2015 |
| WO | WO 2016/156216 | 10/2016 |
| WO | WO 2017/129615 | 8/2017 |
| WO | WO 2017/129616 | 8/2017 |
| WO | WO 2017/129617 | 8/2017 |
| WO | WO 2018/178092 | 10/2018 |
| WO | WO 2019/234055 | 12/2019 |

OTHER PUBLICATIONS

Extended European Search Report for Application No. 18179114.6 dated Jan. 11, 2019 (7 pages).

* cited by examiner

ACTIVATABLE AND RECLOSABLE CARTRIDGE ASSEMBLY FOR AN AEROSOL-GENERATING SYSTEM

This application is a U.S. National Stage Application of International Application No. PCT/EP2019/066407 filed Jun. 20, 2019, which was published in English on Dec. 26, 2019 as International Publication No. WO 2019/243545 A1. International Application No. PCT/EP2019/066407 claims priority to European Application No. 18179114.6 filed Jun. 21, 2018.

The present invention relates to a cartridge assembly for use in an aerosol-generating system and to an aerosol-generating system comprising the cartridge assembly. The present invention finds particular application as a cartridge assembly comprising a nicotine source and an acid source for the generation of an aerosol comprising nicotine salt particles.

Devices for delivering nicotine to a user comprising a nicotine source and a delivery enhancing compound source are known. For example, WO 2008/121610 A1 discloses devices in which nicotine and a volatile acid, such as pyruvic acid, are reacted with one another in the gas phase to form an aerosol of nicotine salt particles that can be inhaled by a user.

Differences between the vapour concentrations of nicotine and the volatile delivery enhancing compound in such devices may disadvantageously lead to an unfavourable reaction stoichiometry or the delivery of excess reactant, such as unreacted nicotine vapour or unreacted volatile delivery enhancing compound vapour to a user. The vapour pressure of pyruvic acid at ambient temperature is substantially greater than that of nicotine. Consequently, to balance the concentration of pyruvic acid vapour and nicotine vapour to yield an efficient reaction stoichiometry, it may be necessary to heat the nicotine source and the pyruvic acid source of devices disclosed in WO 2008/121610 A1 to different temperatures. Specifically, it may be necessary to heat the nicotine source to a higher temperature than the pyruvic acid source in order to generate a sufficient or consistent quantity of nicotine pyruvate salt particles for delivery to a user. This requires the nicotine source and the pyruvic acid source to be stored and heated in physically separate cartridges or other components within the device.

A solution to this issue has been disclosed in WO 2015/197627 A1, which provides an aerosol-generating system and method in which a single heater heats to substantially the same temperature both a nicotine source and a volatile delivery enhancing compound source, such as a lactic acid source. The reaction stoichiometry between nicotine vapour and lactic acid vapour is controlled by controlling the ratio of the volumetric airflow through a first compartment comprising the nicotine source and a second compartment comprising the lactic acid source. Another example of an aerosol-generating system wherein a nicotine source and a lactic acid source are held in separate compartments heated by a single heater is known from WO 2016/046362 A1.

Both WO 2015/197627 A1 and WO 2016/046362 disclose examples of cartridge assemblies for use in an aerosol-generating system, such assemblies comprising frangible barriers of a sealing material for sealing the cartridge compartments housing the nicotine source and the volatile delivery enhancing compound source. Suitable sealing materials include, by way of example, aluminium foil and high density polyethylene.

However, the provision of such frangible barriers may have an impact on the cost of the cartridge assemblies as well as on the overall complexity of the manufacturing process. Besides, due to size constraints, an opening formed in a frangible barrier by a piercing member may at times become blocked during use by portions of the sealing material that have been displaced upon piercing the frangible barriers. This may undesirably alter the ratio in which the compounds housed in the compartments of the cartridge are supplied to the consumer. Furthermore, this may at times disadvantageously lead to an unfavourable reaction stoichiometry, such that some unreacted nicotine vapour or unreacted volatile delivery enhancing compound is undesirably delivered to a user.

Thus, it would be desirable to provide an improved cartridge assembly for use in an aerosol-generating system, the cartridge being configured to maintain the compartments of the cartridge in a sealed state prior to use, such that the shelf life of the cartridge assembly may advantageously be increased, without the use of frangible barriers of the type described above.

Further, it would be desirable to provide one such cartridge assembly wherein the cartridge may be reversibly activated, that is, one wherein airflow into and out of the compartments of the cartridge can be enabled during use and interrupted between subsequent uses.

According to an aspect of the present invention, there is provided a reclosable cartridge assembly for use in an aerosol-generating system. The cartridge assembly comprises a cartridge extending along a longitudinal axis and having at least a first compartment comprised between a cartridge upstream end wall and a cartridge downstream end wall; and a housing comprising at least one rotatable portion, the rotatable portion having an end wall comprising at least one opening, the rotatable portion being rotatably fitted to the cartridge and configured to rotate relative to the cartridge about the longitudinal axis. The rotatable portion is adapted to rotate relative to the cartridge between a storage position and a dispensing position and between the dispensing position and the storage position. At least one of the cartridge upstream end wall and the cartridge downstream end wall comprises at least one rupturable portion. The rotatable portion is adapted to rupture the rupturable portion to expose an opening in the end wall of the cartridge when the rotatable portion is rotated from the storage position to the dispensing position for the first time. The opening in the end wall of the rotatable portion is aligned with the opening in the end wall of the cartridge when the rotatable portion is in the dispensing position. Further, the opening in the end wall of the cartridge is covered by the end wall of the rotatable portion when the rotatable portion is rotated from the dispensing position to the storage position.

According to another aspect of the present invention, there is provided an aerosol-generating system comprising a cartridge assembly as set out above, and an aerosol-generating device comprising a device cavity configured to receive an upstream end of the cartridge assembly and a heater for heating the at least one compartment of the cartridge of the cartridge assembly.

According to a further aspect of the present invention, there is provided a cartridge assembly for use in an aerosol-generating system, the cartridge assembly comprising a cartridge extending along a longitudinal axis and comprising at least a first compartment comprised between a cartridge upstream end wall and a cartridge downstream end wall, the cartridge comprising at least one guide means. Further, the cartridge assembly comprises a housing enclosing the cartridge, the housing comprising: an upstream housing portion comprising an upstream housing end wall, the upstream housing end wall comprising at least one opening; and a downstream housing portion comprising a downstream housing end wall, the downstream housing end wall comprising at least one opening. At least one of the upstream housing portion and the downstream housing portion is rotatably fitted onto the cartridge such that the at least one of the upstream housing portion and the downstream housing portion engages the at least first guide means to rotate about the longitudinal axis relative to the cartridge and to the other one of the upstream housing portion and the downstream housing portion. Further, at least one of the cartridge upstream end wall and the cartridge downstream end wall comprises at least one rupturable portion, the at least one rupturable portion being separable from the remainder of the at least one of the cartridge upstream end wall and the cartridge downstream end wall to expose an opening in the at least one of the cartridge upstream end wall and the cartridge downstream end wall. The at least one of the upstream housing portion and the downstream housing portion is adapted to engage the at least one rupturable portion such that, upon rotation of the at least one of the upstream housing portion and the downstream housing portion from a storage position to a dispensing position, the at least one of the upstream housing portion and the downstream housing portion separates the at least one rupturable portion from the remainder of the at least one of the cartridge upstream end wall and the cartridge downstream end wall and exposes the respective opening. When the at least one of the upstream housing portion and the downstream housing portion is in the dispensing position, the at least one opening in the at least one of the upstream housing portion and the downstream housing portion is in fluid communication with the exposed opening in the at least one of the cartridge upstream end wall and the cartridge downstream end wall. In addition, the at least one of the upstream housing portion and the downstream housing portion is reversibly rotatable between the dispensing position and a closed position; wherein, when the at least one of the upstream housing portion and the downstream housing portion is in the closed position, the end wall of the at least one of the upstream housing portion and the downstream housing portion obstructs the exposed opening in the at least one of the cartridge upstream end wall and the cartridge downstream end wall.

It will be appreciated that any features described with reference to one aspect of the present invention are equally applicable to any other aspect of the invention.

As used herein, the term "aerosol-generating device" refers to a device that interacts with an aerosol-generating substrate to generate an aerosol that is directly inhalable into a user's lungs thorough the user's mouth.

In the context of the present invention, the terms "upstream" and "downstream" describe the relative positions of elements, or portions of elements, of the cartridge assembly in relation to the direction in which the aerosol or precursors thereof are transported through the cartridge assembly during use in an aerosol-generating system.

The term "longitudinal" refers to the direction corresponding to the main longitudinal axis of the cartridge assembly or to the main longitudinal axis of the aerosol-generating device adapted to receive the cartridge assembly for use. Such longitudinal axis extends between the upstream and downstream ends of the aerosol-generating article. During use, air is drawn through the cartridge assembly in the longitudinal direction. The term "transverse" refers to the direction that is perpendicular to the longitudinal axis. Any reference to the "cross-section" of the cartridge assembly or of the aerosol-generating device or of a component of either refers to the transverse cross-section, unless stated otherwise.

As set out above, a reclosable cartridge assembly in accordance with the present invention comprises a cartridge extending longitudinally between end walls, the cartridge being enclosed within a housing. The housing comprises a rotatable portion with an end wall comprising at least one opening. The rotatable portion is rotatably fitted to the cartridge and configures to rotate relative to the cartridge about the longitudinal axis.

Preferably, the housing comprises an upstream portion and a downstream portion. Both upstream portion and downstream portion comprise respective end walls including at least one opening each, and are rotatably fitted onto the cartridge.

The rotatable portion is adapted to rotate relative to the cartridge between a storage position and a dispensing position and between the dispensing position and the storage position. At least one of the cartridge upstream end wall and the cartridge downstream end wall comprises a rupturable portion. The rotatable portion is adapted to rupture the rupturable portion to expose an opening in the end wall of the cartridge when the rotatable portion is rotated from the storage position to the dispensing position for the first time.

In practice, the housing portion fitted onto the cartridge on the same side of the cartridge end wall comprising the rupturable portion is adapted to engage the rupturable portion such that, as the housing portion rotates between the storage position to the dispensing position, the rupturable portion is broken off the remainder of the cartridge end wall to expose the opening formed therein.

Further, as the housing portion rotates between the storage position and the dispensing position, longitudinal alignment is established between the exposed opening in the cartridge end wall and the opening in the housing portion end wall, and an airflow pathway is made available through both end walls. Thus, fluid communication is established between the inside of the cartridge and the outside of the housing. This effectively activates the cartridge and sets it up for use in an aerosol-generating system, such that a consumer can receive an inhalable aerosol.

In addition, the housing portion can be rotated away from the dispensing position to a closed position, wherein the end wall of the housing portion obstructs the exposed opening in the cartridge end wall. As used herein, the term "obstructs" is used to indicate that the airflow pathway is blocked such that airflow into the cartridge (at the upstream end) or out of the cartridge (at the downstream end) or both through one or more exposed opening in the cartridge end walls is substantially prevented.

By contrast, in the dispensing position, the airflow pathway into the cartridge (at the upstream end) or out of the cartridge (at the downstream end) through the opening in the cartridge end wall is unobstructed. As used herein, the term "unobstructed" is used to indicate that an air stream may be drawn into the cartridge through the exposed opening in the upstream end wall or that an air stream may be drawn out of the cartridge through the exposed opening in the downstream end wall or both.

In a reclosable cartridge assembly in accordance with the present invention, it is easy to activate the cartridge by rotating one or both of the rotatable housing portions about the longitudinal axis relative to the cartridge and to one another, such that rupturable portions in the cartridge end walls are broken off to expose openings in the cartridge end walls, and such that an unobstructed airflow path can be established between the compartment or compartments internal to the cartridge and the outside of the cartridge housing.

Prior to separation of the rupturable portions off the end walls of the cartridge, the content of the cartridge can be entirely sealed within the cartridge. This may advantageously increase the shelf-life of cartridge assemblies in accordance with the invention.

Activation of the cartridge is not reversible, and so it is also easy for the consumer to tell whether a given cartridge has been activated or not. However, the unobstructed airflow can be reversibly interrupted by rotating one or both of the housing portions about the longitudinal axis relative to the cartridge and to one another such that the openings in the end walls of the housing portions no longer in alignment with the exposed openings in the end walls of the cartridge.

Thus, fluid communication between the cartridge compartment or compartments and the outer environment can be interrupted again, and so loss of aerosol-forming compounds is substantially prevented. This is advantageous in that, in between consecutive uses, the cartridge assembly can easily be set back into such configuration to preserve the content of the cartridge. Just as easily, the cartridge assembly can then be set up for use by rotating one or both of the housing portions about the longitudinal axis relative to the cartridge and to one another to the dispensing configuration.

All this is advantageously achieved without the need for barriers of the type requiring the provision and operation of piercing members, which would make the manufacturing process more complex and costly.

As described briefly above, in cartridge assemblies in accordance with the present invention at least one of the upstream housing portion and the downstream housing portion is reversibly rotatable between the dispensing position and a closed position. When the at least one of the upstream housing portion and the downstream housing portion is in the closed position, the end wall of the at least one of the upstream housing portion and the downstream housing portion obstructs the exposed opening in the at least one of the cartridge upstream end wall and the cartridge downstream end wall.

In some embodiments, the closed position may substantially coincide with the first position. In other words, between uses, the consumer may rotate the at least one of the upstream housing portion and the downstream housing portion back by the same angular displacement covered when going from the original sealed position to the open position.

In alternative embodiments, by contrast, the closed position may be at a location other than the first position and the second position, such as between the sealed position and the dispensing position.

Advantageously, rotation of the at least one of the upstream housing portion and the downstream housing portion about the longitudinal axis may be effectively prevented until the rupturable portion is broken off to expose the opening in the cartridge end wall. In practice, the cartridge assembly is provided to the consumer with the rotatable housing portion or portions in their respective sealed positions. This may provide the consumer with a very clear indication that a cartridge is still in an entirely sealed state prior to the first use. After the first use, the consumer is reminded that airflow into or out of the cartridge or both can be reversibly interrupted by rotating the at least one of the upstream housing portion and the downstream housing portion into the closed position.

In some embodiments, the cartridge assembly comprises a mouthpiece arranged downstream of the cartridge. The mouthpiece comprises an upstream mouthpiece end wall and a mouthpiece air inlet in the upstream mouthpiece end wall, the mouthpiece air inlet in fluid communication with the opening in the downstream housing end wall. Further, the mouthpiece is rotatable with the downstream housing portion relative to the cartridge. In these embodiments comprising a mouthpiece, the mouthpiece preferably comprises a mouthpiece chamber positioned downstream of the upstream mouthpiece end wall and in fluid communication with the mouthpiece air inlet. Further, the mouthpiece preferably further comprises a mouthpiece air outlet at a downstream end of the mouthpiece chamber.

In such embodiments, the mouthpiece preferably further comprises a ventilation air inlet providing fluid communication between the exterior of the mouthpiece and the mouthpiece chamber, wherein the ventilation air inlet is position between the upstream mouthpiece end wall and the downstream end of the mouthpiece chamber. Further, where the cartridge assembly comprises a mouthpiece, the mouthpiece may comprise a filter. The filter may have a low particulate filtration efficiency or very low particulate filtration efficiency.

Preferably, the at least one guide means comprises a surface having an arcuate shape. More preferably, the at least one guide means extends about the periphery of the cartridge and is substantially formed into the cylindrical wall of the cartridge.

In preferred embodiments, the at least one of the upstream housing portion and the downstream housing portion comprises a linkage for engaging the at least one guide means and the at least one guide means comprises a first end surface and a second end surface. When the at least one of the upstream housing portion and the downstream housing portion is in the dispensing position, the linkage engages the first end surface of the at least one guide means; and when the at least one of the upstream housing portion and the downstream housing portion is in the closed position, the linkage engages the second end surface of the at least one guide means. This is advantageous in that the angular distance between the first end surface and the second end surface of the guide means effectively corresponds to a predetermined angular displacement of the at least one of the upstream housing portion and the downstream housing portion about the longitudinal axis and relative to the cartridge.

In reclosable cartridge assembly in accordance with the present invention, preferably both the cartridge upstream end wall and the cartridge downstream end wall comprise at least one respective rupturable portion, which is separable from the remainder of the respective one of the cartridge upstream end wall and the cartridge downstream end wall to expose a corresponding opening in the respective cartridge end wall.

In preferred embodiments, the cartridge comprises a first compartment and a second compartment, a nicotine source being positioned within the first compartment and an acid source being positioned within the second compartment. The nicotine source may comprise one or more of nicotine, nicotine base, a nicotine salt, such as nicotine-HCl, nicotine-bitartrate, or nicotine-ditartrate, or a nicotine derivative. The nicotine source may comprise natural nicotine or synthetic nicotine. The nicotine source may comprise pure nicotine, a solution of nicotine in an aqueous or non-aqueous solvent or a liquid tobacco extract.

The nicotine source may further comprise an electrolyte forming compound. The electrolyte forming compound may be selected from the group consisting of alkali metal hydroxides, alkali metal oxides, alkali metal salts, alkaline earth metal oxides, alkaline earth metal hydroxides and combinations thereof. For example, the nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulphate and combinations thereof. In certain embodiments, the nicotine source may comprise an aqueous solution of nicotine, nicotine base, a nicotine salt or a nicotine derivative and an electrolyte forming compound. Alternatively or in addition, the nicotine source may further comprise other components including, but not limited to, natural flavours, artificial flavours and antioxidants.

The nicotine source may comprise a sorption element and nicotine sorbed on the sorption element. The sorption element may be formed from any suitable material or combination of materials. For example, the sorption element may comprise one or more of glass, cellulose, ceramic, stainless steel, aluminium, polyethylene (PE), polypropylene, polyethylene terephthalate (PET), poly(cyclohexanedimethylene terephthalate) (PCT), polybutylene terephthalate (PBT), polytetrafluoroethylene (PTFE), expanded polytetrafluoroethylene (ePTFE), and BAREX®.

The sorption element may be a porous sorption element. For example, the sorption element may be a porous sorption element comprising one or more materials selected from the group consisting of porous plastic materials, porous polymer fibres and porous glass fibres. The sorption element is preferably chemically inert with respect to nicotine. The sorption element may have any suitable size and shape.

Preferably, the acid source is a lactic acid source. The lactic acid source may comprise a sorption element and lactic acid sorbed on the sorption element. The sorption element may be formed from any suitable material or combination of materials, for example those listed above. The sorption element is preferably chemically inert with respect to lactic acid. The sorption element may have any suitable size and shape.

In certain embodiments the sorption element may be a substantially cylindrical plug. For example, the sorption element may be a porous substantially cylindrical plug. In other embodiments the sorption element may be a substantially cylindrical hollow tube. For example, the sorption element may be a porous substantially cylindrical hollow tube. The size, shape and composition of the sorption element may be chosen to allow a desired amount of lactic acid to be sorbed on the sorption element. The sorption element advantageously acts as a reservoir for the lactic acid.

Preferably, a reclosable cartridge assembly in accordance with the present invention is configured such that the reaction stoichiometry between nicotine vapour and lactic acid vapour is balanced and controlled by the ratio of volumetric air flow through the first compartment and the second compartment. In more detail, the ratio of the volumetric airflow through the first compartment relative to the volumetric airflow through the second compartment is preferably controlled through variation of one or both of the number and dimensions of air inlets in communication with the first compartment relative to the number and dimensions of air inlets in communication with the second compartment.

In preferred embodiments, the ratio of the volumetric airflow through the first compartment relative to the volumetric airflow through the second compartment is controlled by having a different number of equally sized air inlets in communication with the first compartment and the second compartment, respectively. In general, in cartridge assemblies in accordance with the present invention, air inlets into and out of the first compartment and the second compartment are defined by the opening or openings in the upstream and downstream end walls of the cartridge, which become exposed when corresponding rupturable portions of the cartridge upstream and downstream end walls are broken off the remainder of the respective cartridge end wall, as described above, when the cartridge is activated (that is, when the cartridge is used for the first time).

Thus, in order to achieve a desirable 1:1 stoichiometry between nicotine and lactic acid, in particularly preferred embodiments of the cartridge assemblies in accordance with the present invention, both upstream end wall and downstream end walls of the cartridge are provided with a single rupturable portion adapted to be broken to expose an opening at a location facing the compartment containing the nicotine source, and with a pair of rupturable portions adapted to be broken to expose a pair of corresponding openings at locations facing the compartment containing the lactic acid source. Even more preferably, in each cartridge end wall, the single rupturable portion of the nicotine compartment and the two rupturable portions of the lactic acid compartment are arranged at the vertexes of a triangle. In a particularly preferred embodiment, in each cartridge end wall, the single rupturable portion of the nicotine compartment and the two rupturable portions of the lactic acid compartment are arranged at the vertexes of an isosceles triangle, the two rupturable portions of the lactic acid compartment being equally distant from the single rupturable portions of the nicotine source compartment.

More preferably, in a reclosable cartridge assembly in accordance with the present invention both the upstream housing portion and the downstream housing portion are rotatably fitted onto the cartridge such that both the upstream housing portion and the downstream housing portion engage a respective one of the at least one guide means to rotate about the longitudinal axis relative to the cartridge and relative to each other.

In more detail, the other one of the upstream housing portion and the downstream housing portion is also reversibly rotatable between a respective dispensing position and closed position. When the other one of the upstream housing portion and the downstream housing portion is in the closed position, the end wall of the other one of the upstream housing portion and the downstream housing portion obstructs an opening in the other one of the cartridge upstream end wall and the cartridge downstream end wall, and when the other one of the upstream housing portion and the downstream housing portion is in the closed position, the opening in the other one of the cartridge upstream end wall and the cartridge downstream end wall is in fluid communication with the at least one opening in the other one of the upstream housing portion and the downstream housing portion.

As a general rule, the number and location of the openings in the end walls of the housing portions match the number and location of the exposed openings in the end walls of the cartridge end walls, such that the reclosable cartridge assembly of the invention can be set in a configuration wherein all the openings adapted to enable airflow into and out of the cartridge compartments are unobstructed (which is achieved by moving the housing portions in the dispensing position)

and in a configuration wherein all said openings are obstructed (which is achieved by moving the housing portions in the closed position).

In some embodiments, the other one of the upstream housing portion and the downstream housing portion comprises another linkage for engaging another one of the at least one guide means, the other one of the at least one guide means comprising a first end surface and a second end surface. When the other one of the upstream housing portion and the downstream housing portion is in the dispensing position, the other linkage engages the first end surface of the other one of the at least one guide means. Further, when the other one of the upstream housing portion and the downstream housing portion is in the closed position, the other linkage engages the second end surface of the at least one guide means.

In practice, rotation of the two housing portions about the longitudinal axis and relative to the cartridge and to one another is, to an extent, kinematically linked, such that as the downstream housing portion is moved between the closed position towards the dispensing position, the upstream housing portion may easily be moved at the same time from its respective closed position towards its respective dispensing position.

More preferably, the downstream housing portion is adapted to rotate about the longitudinal axis with respect to both the cartridge and the upstream housing portion as it moves from the closed position to the dispensing position until the other linkage engages the second end surface of the other one of the at least one guide means. Further, the downstream housing portion is adapted to further rotate with the cartridge with respect to the upstream housing portion until the linkage engages the second end surface of the at least one guide means.

Thus, the two housing portions are kinematically linked to one another via the cartridge and the guide means in the cartridge, such that the user can effectively apply a rotating action on the same housing portion (for example, the downstream housing portion) whilst holding the other housing portion to move both downstream housing portion and upstream housing portion into the respecting dispensing positions.

In some embodiments, the angular rotation of the at least one of the upstream housing portion and the downstream housing portion about the longitudinal axis between the closed position and the dispensing position is between 160 degrees and 200 degrees with respect to the cartridge. More preferably, the angular rotation of the at least one of the upstream housing portion and the downstream housing portion about the longitudinal axis between the closed position and the dispensing position is about 180 degrees. An angular rotation in the relatively broad range from about 160 degrees and about 200 degrees as described above is particularly effective in those embodiments where a diameter of the openings in the housing portions and in the cartridge end walls is about one third of an overall diameter of the cartridge assembly. By way of example, the diameter of the opening may be about 1.1 millimetres and the overall diameter of the cartridge assembly may be about 3.4 millimetres. In embodiments where the openings have a smaller diameter, a narrower range of angular rotation is preferred, such as from about 170 degrees to 190 degrees, even more preferably from about 175 degrees to about 185 degrees.

Preferably, the linkage comprises a pin formed integrally with a respective housing end wall and extending from the housing end wall towards the cartridge.

In some preferred embodiments, the cartridge assembly further comprises a third compartment for receiving a heating element of an aerosol-generating device, the third compartment positioned between the first compartment and the second compartment, and wherein the upstream housing end wall comprises an aperture aligned with the third compartment when upstream housing portion is in the dispensing position. This is so, when the upstream housing portion is in the dispensing position a heating element of an aerosol-generating device may be inserted into the third compartment through the aperture in the upstream housing end wall, the heating element being adapted to supply heat to the content of the cartridge compartments.

Heating the nicotine source and the lactic acid source to a temperature above ambient temperature using a single heater allows control of the amount of nicotine vapour and lactic acid vapour released from the nicotine source and the lactic acid source, respectively. This advantageously enables the vapour concentrations of the nicotine and the lactic acid to be controlled and balanced proportionally to yield an efficient reaction stoichiometry. This advantageously improves the efficiency of the formation of an aerosol and the consistency of nicotine delivery to a user. Further, it advantageously reduces the risk of undesired delivery of excess reactant, that is unreacted nicotine vapour or unreacted lactic acid vapour, to a user.

In other embodiments, the cartridge preferably comprises a heating element provided in the form of a susceptor positioned between the first compartment and the second compartment. This makes it possible for the heating of the aerosol-forming components in the cartridge assembly to be effected in a contactless manner by induction-heating.

To this purpose, one such cartridge assembly according to the present invention is intended for use in an aerosol-generating device comprising an induction source, which is configured to produce an alternating electromagnetic field that induces a heat generating eddy current in the susceptor material.

The susceptor is arranged in thermal proximity of the aerosol-forming components in the compartments of the cartridge assembly. The heated susceptor in turn heats the aerosol-forming components to release volatile compounds and form an aerosol.

The susceptor may comprise a first susceptor material and a second susceptor material, the first susceptor material being disposed in intimate physical contact with the second susceptor material. The second susceptor material preferably has a Curie temperature that is lower than 500 degrees Celsius. The first susceptor material is preferably used primarily to heat the susceptor when the susceptor is placed in a fluctuating electromagnetic field. Any suitable material may be used. For example the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys.

A reclosable cartridge assembly in accordance with the invention can be used and provided as part of an aerosol-generating system comprising an aerosol-generating device comprising a device cavity configured to receive an upstream end of the cartridge assembly and a heating element for heating the at least one compartment of the cartridge of the cartridge assembly.

In preferred embodiments, the cartridge comprises a susceptor, and so the heating element of the aerosol-generating device is effectively an indirect heating element and may be provided in the form of an induction source, as described briefly above.

The invention will now be further described with reference to the drawings of the following Figures, wherein.

Figure 3:
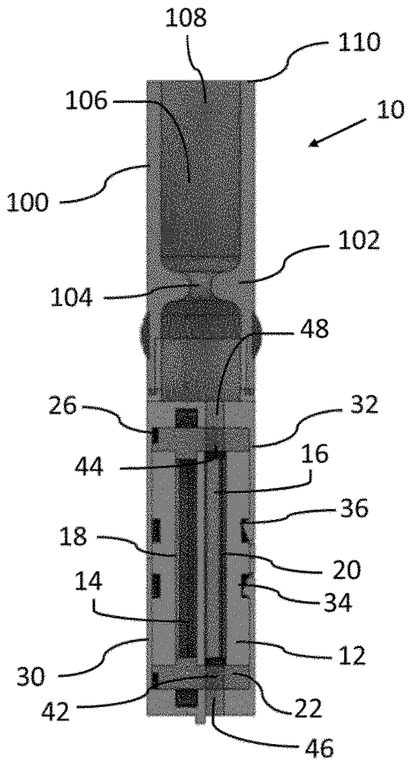
FIG. 3 is a further side, sectional view of the reclosable cartridge assembly of FIGS. 1 and 2 in the open position (activated cartridge)
Figure 4:
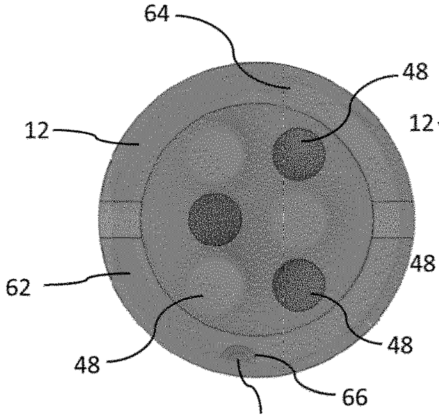
Figure 5:
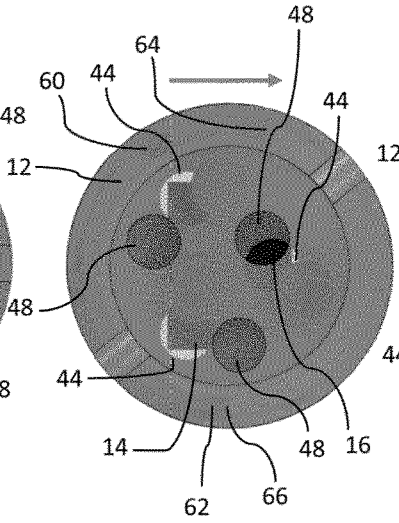
Figure 6:
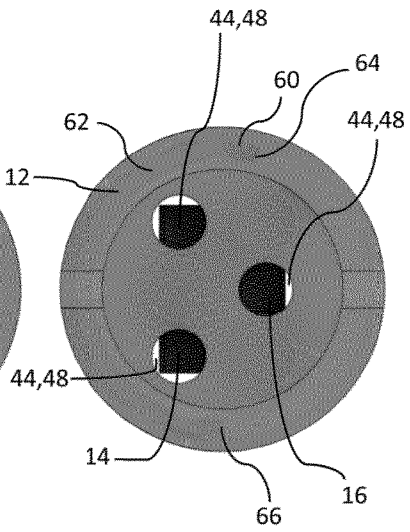
Figure 7:
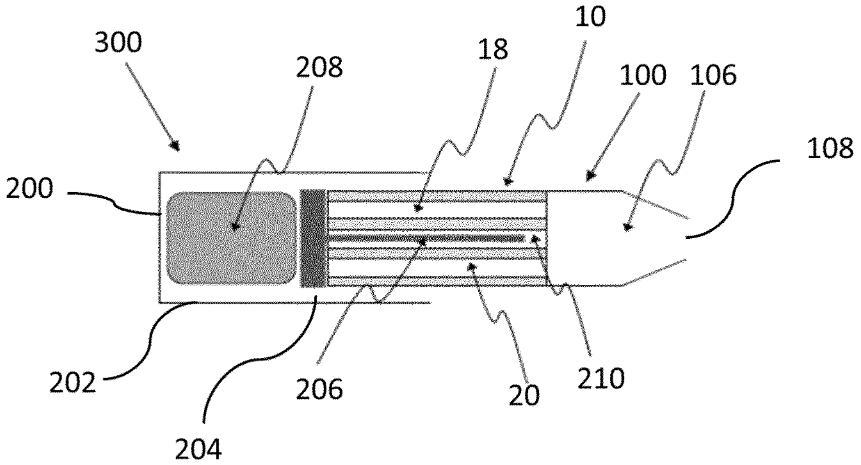

FIGS. 4, 5 and 6 are schematic cross-sectional views of the reclosable cartridge assembly in the plane A-A of FIG. 3 during rotation of the housing portion relative to the cartridge between the closed position and the open position; and FIG. 7 is a schematic sectional side view of an aerosol-generating system comprising an aerosol-generating and a cartridge assembly in accordance with the present invention.

Figure 1:
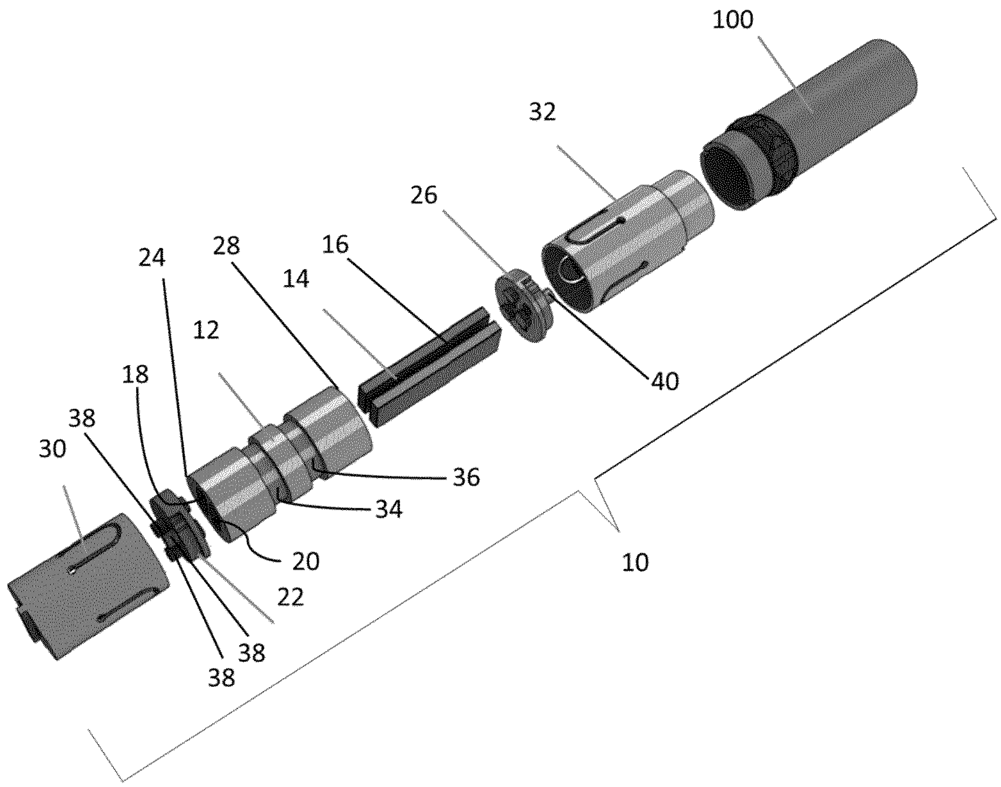
FIG. 1 is an exploded perspective view of a reclosable cartridge assembly in accordance with the present invention.
Figure 2:
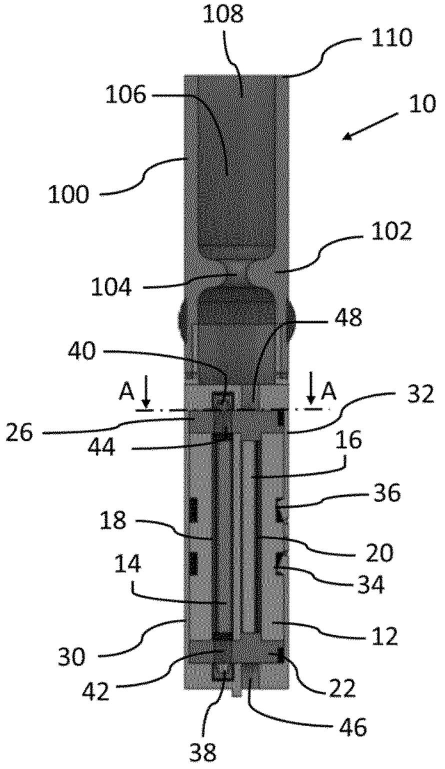
FIG. 2 is a side, sectional view of the reclosable cartridge assembly of FIG. 1 in the sealed position.

The cartridge assembly 10 in FIGS. 1, 2 and 3 comprises a substantially cylindrical cartridge 12 adapted to receive a pair of sorption elements 14, 16 into respective first and second compartments 18, 20. The first sorption element 14 is loaded with a nicotine source, whereas the second sorption element 16 is loaded with a lactic acid source. Both compartments 18, 20 are closed at their ends by a first cartridge end wall 22 provided at an upstream end 24 of the cartridge 12 and a second cartridge end wall 26 provided at a downstream end 28 of the cartridge 12. In more detail, in the embodiment illustrated in the Figures, the cartridge end walls 22 and 26 are provided as cover elements (as shown clearly in the exploded view of FIG. 1) that are welded to a substantially cylindrical body of the cartridge 12 once the sorption elements 14 and 16 loaded with the respective aerosol-forming sources have been housed within the compartments defined within the cylindrical body.

Further, the cartridge assembly 10 comprises an upstream housing portion 30 and a downstream housing portion 32. The upstream shell member 30 and the downstream housing portion 32 are adapted to be fitted onto the cartridge 12. Each one of the housing portions 30, 32 comprises a tubular body adapted to partly receive the cartridge 12. In more detail, in the embodiment shown in FIGS. 1, 2 and 3, each one of the tubular bodies of the housing portions 30, 32 has a length such as to be able to accommodate about 50 percent of the length of the cartridge 12.

The housing portions 30, 32 comprise retaining elements (not shown) adapted to snap-fit into corresponding slits or grooves in a lateral wall of the cartridge 12. In more detail, the lateral wall of the cartridge comprises two grooves 34, 36 extending about the circumference of the cartridge 12, such that each one of the housing portions 30, 32 can snap-fit onto the cartridge 12 and be rotatable about the longitudinal axis of the cartridge assembly relative to the cartridge 12 as well as to each other.

Further, both cartridge upstream end wall 22 and 26 comprise respective rupturable portions 38, 40. The rupturable portions 38, 40 are separable from the remainder of the respective end walls 22, 26 to expose corresponding openings 42, 44 in the cartridge upstream end wall and the cartridge downstream end wall (see FIGS. 2 and 3).

As illustrated in FIG. 2, the upstream housing portion 30 and the downstream housing portion 32 are adapted to engage the rupturable portions 38, 40 such that, upon rotation of housing portions 30, 32 from a storage position (FIG. 2) to a dispensing position (FIG. 3), the upstream housing portion and the downstream housing portion break and separate the rupturable portions 38, 40 from the remainder of the respective cartridge end walls 22, 26 expose the respective exposed openings 42, 44.

When the upstream housing portion 30 and the downstream housing portion 32 are in the dispensing position (FIG. 3), openings 46, 48 in the end walls 50, 52 of the upstream housing portion 30 and the downstream housing portion 32 are in fluid communication with the exposed openings 42, 44 in the cartridge upstream end wall 22 and the cartridge downstream end wall 26.

The upstream housing portion 30 and the downstream housing portion 32 are reversibly rotatable between the dispensing position (FIG. 3; further reference can be made to FIG. 6) and a closed position (substantially corresponding to the position illustrated in FIG. 2; further reference can be made to FIG. 4). In the embodiment illustrated in the figures, the closed position substantially coincides with the sealed position.

When the upstream housing portion 30 and the downstream housing portion 32 are in the closed position, the end walls 50, 52 of the 30 upstream housing portion and the downstream housing portion 32 obstruct the exposed openings 42, 44 in the cartridge upstream end wall 22 and the cartridge downstream end wall 26.

Movement of the housing portions between the closed position and the dispensing position is illustrated in FIGS. 4, 5 and 6 with specific reference to the downstream housing portion 32. Both housing portions 30, 32 comprise respective linkages 60 for engaging corresponding guide means 62 in the cartridge, and the guide means 62 comprise a first end surface 64 and a second end surface 66. In the embodiment shown in the Figures, the guide means 62 are provided in the cover elements comprising the cartridge end walls.

When the downstream housing portion 32 is in the dispensing position (see FIG. 6), the linkage 60 engages the first end surface 64 of the guide means 62. When the downstream housing portion 32 is in the closed position (see FIG. 4), the linkage 60 engages the second end surface 66 of the guide means 62.

The cartridge assembly 10 further comprises a mouthpiece 100 detachably attached to a downstream end of the downstream housing portion 32. As such, the mouthpiece 100 is configured to be rotatable about the longitudinal axis of the cartridge 12 with the downstream housing portion 32. The mouthpiece 100 comprises an upstream mouthpiece end wall 102 and a mouthpiece air inlet 104 in the upstream mouthpiece end wall 102. The mouthpiece air inlet 104 is in fluid communication with the openings in the upstream housing portion 32.

Further, the mouthpiece 100 comprises a mouthpiece chamber 106 positioned downstream of the upstream mouthpiece end wall 102 and in fluid communication with the mouthpiece air inlet 104. The mouthpiece 100 further comprises a mouthpiece air outlet 108 at a downstream end 110 of the mouthpiece chamber 106.

In the embodiment of the Figures, the mouthpiece 50 further comprises a ventilation air inlet 62 providing fluid communication between the exterior of the mouthpiece 50 and the mouthpiece chamber 56. In more detail, the ventilation air inlet 62 is positioned between the upstream mouthpiece end wall 52 and the downstream end 60 of the mouthpiece chamber 56.

In order to use the cartridge assembly 10 in an aerosol-generating device, the consumer activates the cartridge by moving the piercing members 38, 44 from the first position into the second position, such that the frangible barriers 22, 26 are ruptured and the compartments 18, 20 are placed in fluid communication with the mouthpiece and the outer environment.

As shown schematically in FIG. 7, an aerosol-generating system 300 comprises an aerosol-generating device 200 comprises a housing 202 comprising a substantially cylindrical cavity 204 in which the cartridge assembly 10 is partly received. As shown in FIG. 7, the length of the cavity 204 is less than the length of the cartridge assembly 10 so that when the cartridge assembly 10 is inserted into the aerosol-generating device 200 at least the mouthpiece 100 projects from the cavity 204.

The aerosol-generating device 200 comprises heating means configured to heat the compartments 18, 20 of the cartridge assembly. In the embodiment schematically represented in FIG. 4, the aerosol-generating system 300 comprises a heating element 206 provided as a susceptor within a chamber 210 of the cartridge 12 extending between the two compartments 16 and 18 along the major axis of the cartridge 12. The aerosol-generating device further comprises a power supply 208 in the form of a battery and a controller (not shown) comprising electronic circuitry, which is connected to the power supply 208 and to an induction source (not shown), which is configured to produce an alternating electromagnetic field that induces a heat generating eddy current in the susceptor material.

Once the cartridge assembly 10 is inserted into the aerosol-generating device 200 and activated as set out above, the induction source induces heat by generating eddy current in the susceptor 206 and thus heats the nicotine source and the lactic acid source in the cartridge 12 to substantially the same temperature of about 100 degrees Celsius.

During use, the consumer draws on the mouthpiece 200 of the cartridge assembly 10 to draw air through the cartridge 12. As the drawn air passes through the cartridge 12, nicotine vapour is released from the nicotine source in the first compartment 18 and lactic acid vapour is released from the lactic acid source in the second compartment 20. The nicotine vapour reacts with the lactic acid vapour in the gas phase to form an aerosol of nicotine lactate salt particles, which is delivered to the consumer through the mouthpiece chamber 106 and the mouthpiece air outlet 108.

The invention claimed is:

1. A reclosable cartridge assembly for use in an aerosol-generating system, the cartridge assembly comprising:

a cartridge extending along a longitudinal axis and having at least a first compartment comprised between a cartridge upstream end wall and a cartridge downstream end wall; and a housing comprising at least one rotatable portion, the rotatable portion having an end wall comprising at least one opening, the rotatable portion being rotatably fitted to the cartridge and configured to rotate relative to the cartridge about the longitudinal axis;

wherein:

the rotatable portion is adapted to rotate relative to the cartridge between a storage position and a dispensing position and between the dispensing position and the storage position;

at least one of the cartridge upstream end wall and the cartridge downstream end wall comprises at least one rupturable portion;

the rotatable portion is adapted to rupture the rupturable portion to expose an opening in the end wall of the cartridge when the rotatable portion is rotated from the storage position to the dispensing position for the first time;

the opening in the end wall of the rotatable portion is aligned with the opening in the end wall of the cartridge when the rotatable portion is in the dispensing position; and the opening in the end wall of the cartridge is covered by the end wall of the rotatable portion when the rotatable portion is rotated from the dispensing position to the storage position.

2. The reclosable cartridge assembly according to claim 1, wherein the cartridge comprises at least one guide means and the at least one rotatable portion comprises:

an upstream housing portion comprising an upstream housing end wall, the upstream housing end wall comprising at least one opening; and a downstream housing portion comprising a downstream housing end wall, the downstream housing end wall comprising at least one opening;

wherein at least one of the upstream housing portion and the downstream housing portion is rotatably fitted onto the cartridge such that the at least one of the upstream housing portion and the downstream housing portion engages the at least first guide means to rotate about the longitudinal axis relative to the cartridge and to the other one of the upstream housing portion and the downstream housing portion;

wherein the at least one rupturable portion is separable from the remainder of the at least one of the cartridge upstream end wall and the cartridge downstream end wall to expose the opening in the at least one of the cartridge upstream end wall and the cartridge downstream end wall;

wherein the at least one of the upstream housing portion and the downstream housing portion is adapted to engage the at least one rupturable portion such that, upon rotation of the at least one of the upstream housing portion and the downstream housing portion from the storage position to the dispensing position, the at least one of the upstream housing portion and the downstream housing portion separates the at least one rupturable portion from the remainder of the at least one of the cartridge upstream end wall and the cartridge downstream end wall and exposes the respective opening;

wherein, when the at least one of the upstream housing portion and the downstream housing portion is in the dispensing position, the at least one opening in the at least one of the upstream housing portion and the downstream housing portion is in fluid communication with the exposed opening in the at least one of the cartridge upstream end wall and the cartridge downstream end wall; and wherein the at least one of the upstream housing portion and the downstream housing portion is reversibly rotatable between the dispensing position and a closed position; wherein, when the at least one of the upstream housing portion and the downstream housing portion is in the closed position, the end wall of the at least one of the upstream housing portion and the downstream housing portion obstructs the exposed opening in the at least one of the cartridge upstream end wall and the cartridge downstream end wall.

3. The reclosable cartridge assembly according to claim 2, wherein the closed position substantially coincides with the sealed position.

4. The reclosable cartridge assembly according to claim 2, wherein the closed position is between the sealed position and the dispensing position.

5. The reclosable cartridge assembly according to claim 1 comprising a mouthpiece, the mouthpiece comprising an upstream mouthpiece end wall and a mouthpiece air inlet in the upstream mouthpiece end wall, the mouthpiece air inlet in fluid communication with the opening in the downstream housing end wall, wherein the mouthpiece is rotatable with the downstream housing portion relative to the cartridge.

6. The reclosable cartridge assembly according to claim 1, wherein the at least one guide means comprises a surface having an arcuate shape.

7. The reclosable cartridge assembly according to claim 2, wherein at least one of the upstream housing portion and the downstream housing portion comprises a linkage for engaging the at least one guide means and the at least one guide means comprises a first end surface and a second end surface; wherein when the at least one of the upstream housing portion and the downstream housing portion is in the dispensing position, the linkage engages the first end surface of the at least one guide means; and when the at least one of the upstream housing portion and the downstream housing portion is in the closed position, the linkage engages the second end surface of the at least one guide means.

8. The reclosable cartridge assembly according to claim 2 wherein both the upstream housing portion and the downstream housing portion are rotatably fitted onto the cartridge such that both the upstream housing portion and the downstream housing portion engage a respective one of the at least one guide means to rotate about the longitudinal axis relative to the cartridge and relative to each other; wherein the other one of the upstream housing portion and the downstream housing portion is also reversibly rotatable between a dispensing position and a closed position; wherein, when the other one of the upstream housing portion and the downstream housing portion is in the closed position, the end wall of the other one of the upstream housing portion and the downstream housing portion obstructs an opening in the other one of the cartridge upstream end wall and the cartridge downstream end wall, and when the other one of the upstream housing portion and the downstream housing portion is in the closed position, the opening in the other one of the cartridge upstream end wall and the cartridge downstream end wall is in fluid communication with the at least one opening in the other one of the upstream housing portion and the downstream housing portion.

9. The reclosable cartridge assembly according to claim 8 wherein the other one of the upstream housing portion and the downstream housing portion comprises another linkage for engaging another one of the at least one guide means, the other one of the at least one guide means comprising a first end surface and a second end surface; wherein when the other one of the upstream housing portion and the downstream housing portion is in the dispensing position, the other linkage engages the first end surface of the other one of the at least one guide means; and when the other one of the upstream housing portion and the downstream housing portion is in the closed position, the other linkage engages the second end surface of the at least one guide means.

10. The reclosable cartridge assembly according to claim 9 wherein the downstream housing portion is adapted to rotate about the longitudinal axis with respect to both the cartridge and the upstream housing portion as it moves from the closed position to the dispensing position until the other linkage engages the second end surface of the other one of the at least one guide means; and wherein the downstream housing portion is adapted to further rotate with the cartridge with respect to the upstream housing portion until the linkage engages the second end surface of the at least one guide means.

11. The reclosable cartridge assembly according to claim 2, wherein the angular rotation of the at least one of the upstream housing portion and the downstream housing portion about the longitudinal axis between the closed position and the dispensing position is between 160 degrees and 200 degrees with respect to the cartridge.

12. The reclosable cartridge assembly according to claim 7, wherein the linkage comprises a pin formed integrally with a respective housing end wall and extending from the housing end wall towards the cartridge.

13. The reclosable cartridge assembly according to claim 1, wherein the cartridge further comprises a second compartment, a nicotine source being positioned within the first compartment and an acid source being positioned within the second compartment.

14. The reclosable cartridge assembly according to claim 13, wherein the cartridge further comprises a third compartment for receiving a heating element of an aerosol-generating device, the third compartment positioned between the first compartment and the second compartment, and wherein the upstream housing end wall comprises an aperture aligned with the third compartment when the upstream housing portion is in the dispensing position.

15. The cartridge assembly according to claim 13, wherein the cartridge further comprises a susceptor positioned between the first compartment and the second compartment.

16. An aerosol-generating system comprising:

the reclosable cartridge assembly according to claim 1; and an aerosol-generating device comprising a device cavity configured to receive an upstream end of the cartridge assembly and a heater for heating the at least one compartment of the cartridge of the cartridge assembly.

17. The aerosol-generating system according to claim 16, wherein the cartridge comprises a second compartment extending substantially parallel to the first compartment and the heater comprises an inductive heater surrounding at least a portion of the device cavity, the cartridge further comprising a susceptor positioned between the first compartment and the second compartment.

18. A reclosable cartridge assembly for use in an aerosol-generating system, the cartridge assembly comprising:

a cartridge extending along a longitudinal axis and comprising at least a first compartment comprised between a cartridge upstream end wall and a cartridge downstream end wall, the cartridge comprising at least one guide means;

a housing enclosing the cartridge, the housing comprising:

an upstream housing portion comprising an upstream housing end wall, the upstream housing end wall comprising at least one opening; and a downstream housing portion comprising a downstream housing end wall, the downstream housing end wall comprising at least one opening;

wherein at least one of the upstream housing portion and the downstream housing portion is rotatably fitted onto the cartridge such that the at least one of the upstream housing portion and the downstream housing portion engages the at least first guide means to rotate about the longitudinal axis relative to the cartridge and to the other one of the upstream housing portion and the downstream housing portion;

wherein at least one of the cartridge upstream end wall and the cartridge downstream end wall comprises at least one rupturable portion, the at least one rupturable portion being separable from the remainder of the at least one of the cartridge upstream end wall and the cartridge downstream end wall to expose an opening in the at least one of the cartridge upstream end wall and the cartridge downstream end wall;

wherein the at least one of the upstream housing portion and the downstream housing portion is adapted to engage the at least one rupturable portion such that, upon rotation of the at least one of the upstream housing portion and the downstream housing portion from a storage position to a dispensing position, the at least one of the upstream housing portion and the downstream housing portion separates the at least one rupturable portion from the remainder of the at least one of the cartridge upstream end wall and the cartridge downstream end wall and exposes the respective opening;

wherein, when the at least one of the upstream housing portion and the downstream housing portion is in the dispensing position, the at least one opening in the at least one of the upstream housing portion and the downstream housing portion is in fluid communication with the exposed opening in the at least one of the cartridge upstream end wall and the cartridge downstream end wall; and wherein the at least one of the upstream housing portion and the downstream housing portion is reversibly rotatable between the dispensing position and a closed position; wherein, when the at least one of the upstream housing portion and the downstream housing portion is in the closed position, the end wall of the at least one of the upstream housing portion and the downstream housing portion obstructs the exposed opening in the at least one of the cartridge upstream end wall and the cartridge downstream end wall.

* * * * *